(12) United States Patent
Barzegar et al.

(10) Patent No.: US 8,601,529 B1
(45) Date of Patent: Dec. 3, 2013

(54) METHOD AND APPARATUS FOR PROVIDING INTEGRATED WIRELESS TRIPLE PLAY SERVICES

(75) Inventors: Farhad Barzegar, Branchburg, NJ (US); George Blandino, Bridgewater, NJ (US); Irwin Gerszberg, Kendall Park, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 441 days.

(21) Appl. No.: 11/618,895

(22) Filed: Dec. 31, 2006

(51) Int. Cl.
*H04N 7/16* (2011.01)

(52) U.S. Cl.
USPC .......................................... 725/150

(58) Field of Classification Search
USPC ......................... 725/74–82, 63–72
See application file for complete search history.

(56) References Cited

U.S. PATENT DOCUMENTS

| | | | |
|---|---|---|---|
| 6,647,117 B1 * | 11/2003 | Wallace et al. | 379/413 |
| 7,382,786 B2 | 6/2008 | Chen et al. | |
| 7,542,721 B1 | 6/2009 | Bonner et al. | |
| 7,565,418 B2 * | 7/2009 | Ferrari et al. | 709/220 |
| 2002/0106997 A1 | 8/2002 | Barber et al. | |
| 2002/0119797 A1 * | 8/2002 | Woodhead et al. | 455/522 |
| 2002/0162116 A1 | 10/2002 | Read et al. | |
| 2003/0212999 A1 | 11/2003 | Cai | |
| 2004/0027992 A1 * | 2/2004 | Volkening et al. | 370/241 |
| 2004/0041903 A1 | 3/2004 | Drexler et al. | |
| 2004/0183947 A1 * | 9/2004 | Lee | 348/570 |
| 2005/0055729 A1 * | 3/2005 | Atad et al. | 725/118 |
| 2005/0114893 A1 * | 5/2005 | Wetmore | 725/71 |
| 2005/0229226 A1 | 10/2005 | Relan et al. | |
| 2006/0077921 A1 * | 4/2006 | Radpour | 370/316 |
| 2007/0036148 A1 * | 2/2007 | King | 370/352 |
| 2007/0105548 A1 | 5/2007 | Mohan et al. | |
| 2007/0130592 A1 * | 6/2007 | Haeusel | 725/81 |
| 2007/0183396 A1 | 8/2007 | Bennett et al. | |
| 2007/0258590 A1 * | 11/2007 | Beaton et al. | 380/212 |
| 2007/0260708 A1 * | 11/2007 | Beaton et al. | 709/219 |
| 2008/0064388 A1 * | 3/2008 | Duarte et al. | 455/425 |
| 2008/0130531 A1 * | 6/2008 | Chou | 370/310 |

* cited by examiner

*Primary Examiner* — Vivek Srivastava
*Assistant Examiner* — Aklil Tesfaye

(57) ABSTRACT

A method and apparatus for enabling the integration of key components associated with triple play services into an integrated system are disclosed. For example, the method integrates rooftop components for providing the triple play services into an outdoor unit (ODU) and integrates in-house components into a triple play service set top box for providing the triple play services.

18 Claims, 13 Drawing Sheets

500

600

700

900

1000

1100

1200

METHOD AND APPARATUS FOR PROVIDING INTEGRATED WIRELESS TRIPLE PLAY SERVICES

The present application is related to U.S. patent application entitled "METHOD AND APPARATUS FOR PROVIDING LEGACY TELEPHONE SUPPORT", having Ser. No. 11/618,896 and U.S. patent application entitled "METHOD AND APPARATUS FOR PROVIDING BACKUP POWER MANAGEMENT", having Ser. No. 11/618,880, where both applications are herein incorporated by reference and both applications are simultaneously filed on the same date with the present application.

The present invention relates generally to communication networks and, more particularly, to a method and apparatus for providing integrated wireless triple play services in communication networks.

BACKGROUND OF THE INVENTION

In a typical wireless triple play service, a satellite receiver is used for the reception of one-way digital broadcast video from a satellite content provider and a broadband modem is used to support wired broadband internet access with an Internet Service Provider (ISP) as well as Voice over Internet Protocol (VoIP) services with a VoIP service provider. Triple play service refers to services that provide video, voice, and data simultaneously. Existing triple play services using satellite broadcast digital video requires the use of a satellite dish to receive satellite video feeds and an independent wired broadband connection to support data and voice services. The two disjoint methods require different technicians to install different types of wiring and access equipment within a household to use this type of disjoint triple play services.

Therefore, a need exists for a method and apparatus for providing integrated wireless triple play services in communication networks.

SUMMARY OF THE INVENTION

In one embodiment, the present invention enables the integration of key components associated with triple play services into an integrated system. For example, the method integrates rooftop components for providing the triple play services into an outdoor unit (ODU) and integrates in-house components into a triple play service set top box for providing the triple play services.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
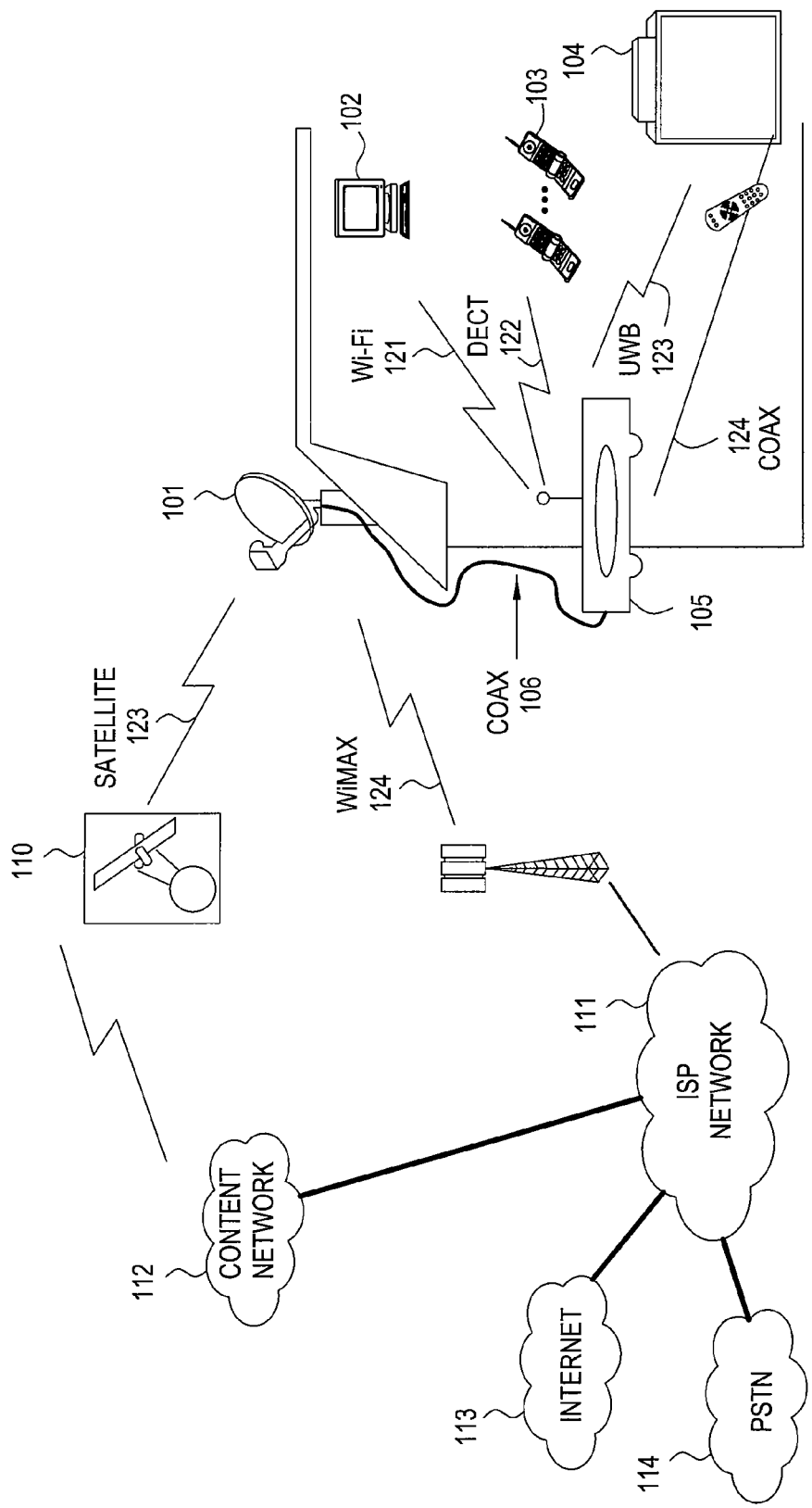
FIG. 1 illustrates an exemplary architecture of integrated wireless triple play services of the present invention.

In order to support a truly integrated wireless triple play service using wireless technologies, the present invention enables the use of satellite services to support digital broadcast video and Worldwide Interoperability for Microwave Access (WiMAX) to support broadband internet data and voice services. FIG. 1 illustrates an exemplary architecture 100 of integrated wireless triple play services of the present invention.

In FIG. 1, a household uses an integrated satellite rooftop section and a WiMAX modem to support integrated video, voice, and data services. In one embodiment, the present invention integrates a WiMAX Customer Premise Equipment (CPE) which is embedded with the rooftop section of the satellite receiver. The integrated rooftop section of the satellite receiver with an embedded WiMAX CPE is shown as receiver 101 in FIG. 1. This integration enables the same technician who installs the satellite receiver to also install and aim the outdoor WiMAX CPE towards a proper terrestrial WiMAX base station. This will provide ample signal for the WiMAX CPE to work efficiently unhindered by in-building signal penetration issues.

WiMAX refers to the IEEE 802.16 standard officially known as Wireless Metropolitan Area Network (MAN). WiMAX is a standard based technology that enables the delivery of last mile wireless broadband access as an alternative to wired broadband access.

Receiver 101 receives digital satellite video contents via wireless satellite link 123 from content provider 112 via satellite 110. Receiver 101 also supports broadband Internet voice and data connectivity via wireless WiMAX link 124 to and from ISP 111. Note that ISP 111 in turn provides data and voice connectivity to Internet 113 and Public Switched Telephone Network (PSTN) 114. Coaxial cable 106 interconnects receiver 101 and set top box 105. Coaxial cable 106 carries a combined signal comprising the satellite related video signals and the WiMAX related data and voice signals using a single coaxial cable. Thus, the triple play service integration of the present invention is further enhanced by using the same coaxial cable to support the satellite related video signals and the WiMAX related broadband Internet voice and data signals to a single set top box. The approach of having an outdoor WiMAX CPE integrated with the rooftop section of a satellite receiver, such as receiver 101, overcomes multiple issues of providing the triple-play service previously not possible, such as achieving very high radio frequency link margins that allows high-quality service and convenience of a single device, such as set top box 105, providing all these services inside a single household.

Within the household, an integrated set top box 105 provides different types of local connectivity to support triple play services. For example, set top box 105 supports data connectivity to PC 102 using wireless Wi-Fi link 121. Set top box 105 supports voice connectivity to a set of digital cordless telephones 103 using wireless cordless telephone technology, such as Digital Enhanced Cordless Telecommunications (DECT) link 122. Set top box 105 supports digital video connectivity to TV 104 using wireless Ultra Wideband (UWB) link 123 or using wired Coaxial Cable 124.

DECT is a standard for digital cordless phones commonly used for domestic or corporate purposes. UWB refers to a technology for transmitting information spread over a large bandwidth, such as larger than 500 MHz, which enables spectrum sharing among multiple users.

In one embodiment, set top box 105 integrates a satellite video receiver section, a video processor, a firewall router, a Wi-Fi Access Point, a Telephone Adaptor (TA), and a digital cordless phone base station into a single device supporting triple play services in a household. Note that existing triple play services require the use of multiple service access devices. For instance, a separate satellite video processor is required for satellite video services, a separate VoIP TA is required for VoIP services, and a separate broadband modem is required for broadband data services. The integrated triple play service set top box can be placed on top of TV 104 which will also distribute video, data, and voice wirelessly inside the home of a subscriber. The set top box supporting triple play services is the communication and entertainment center of the household. The details of set top box 105 will be described further later.

Figure 2:
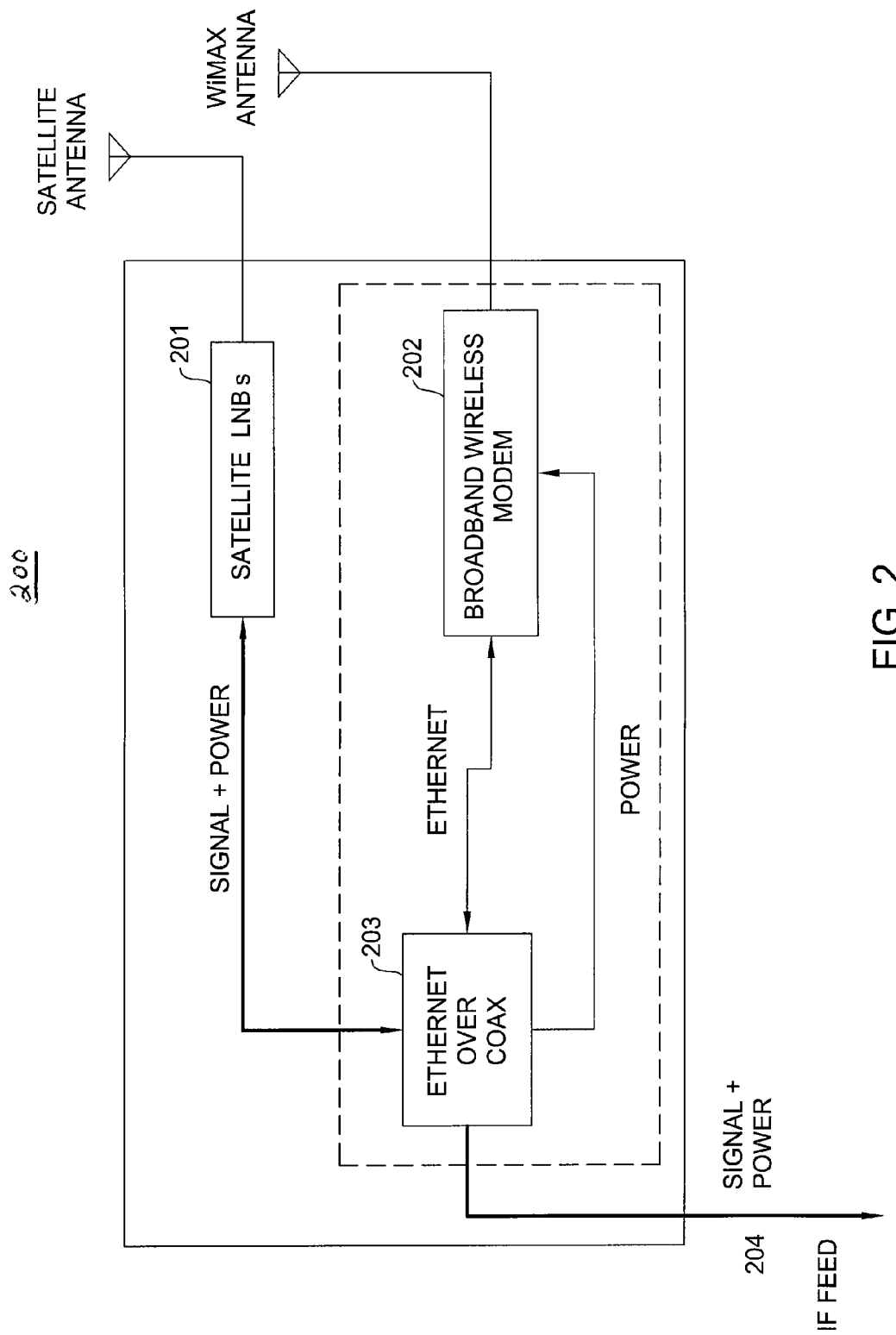
FIG. 2 illustrates a block diagram of an exemplary triple play service outdoor unit of the present invention.

FIG. 2 illustrates a block diagram of an exemplary triple play service outdoor unit (ODU) 200 of the present invention. FIG. 2 provides the next level of details of rooftop receiver 101 as shown in FIG. 1. In one embodiment, satellite Low Noise Block (LNB) 201 receives power from Ethernet over Coax device 203 which in turn receives power from coaxial cable 204 powered by set top box 105 shown in FIG. 1. LNB 201 receives digital signal from a satellite and converts the received high frequency video signals into intermediate frequency (IF) signals and sends the IF video signals to Ethernet over coax device 203 for distribution to set top box 105 using coaxial cable 204.

Broadband wireless modem 202, e.g., a WiMAX CPE modem, receives power from Ethernet over Coax device 203 which in turn receives power from coaxial cable 204 powered by set top box 105 shown in FIG. 1. Broadband wireless modem 202 transmits and receives broadband voice and data signals to and from a broadband wireless base station, such as a WiMAX base station, to support wireless broadband connectivity. Broadband wireless modem 202 is also connected to Ethernet over coax device 203 using Ethernet technology to support broadband connectivity related signals to the triple play service set top box located inside the household. Ethernet over coax device 203 transmits and receives broadband voice and data signals to and from set top box 105 using coaxial cable 204. Note that Ethernet over coax device 203 combines the satellite IF video signals with the wireless broadband voice and data signals to be distributed to the set top box using a single coaxial cable, such as coaxial cable 204. The use of a single cable for in-house combined voice, video, and data signal distribution eliminates the need for independent wirings for different signal types.

Figure 3:
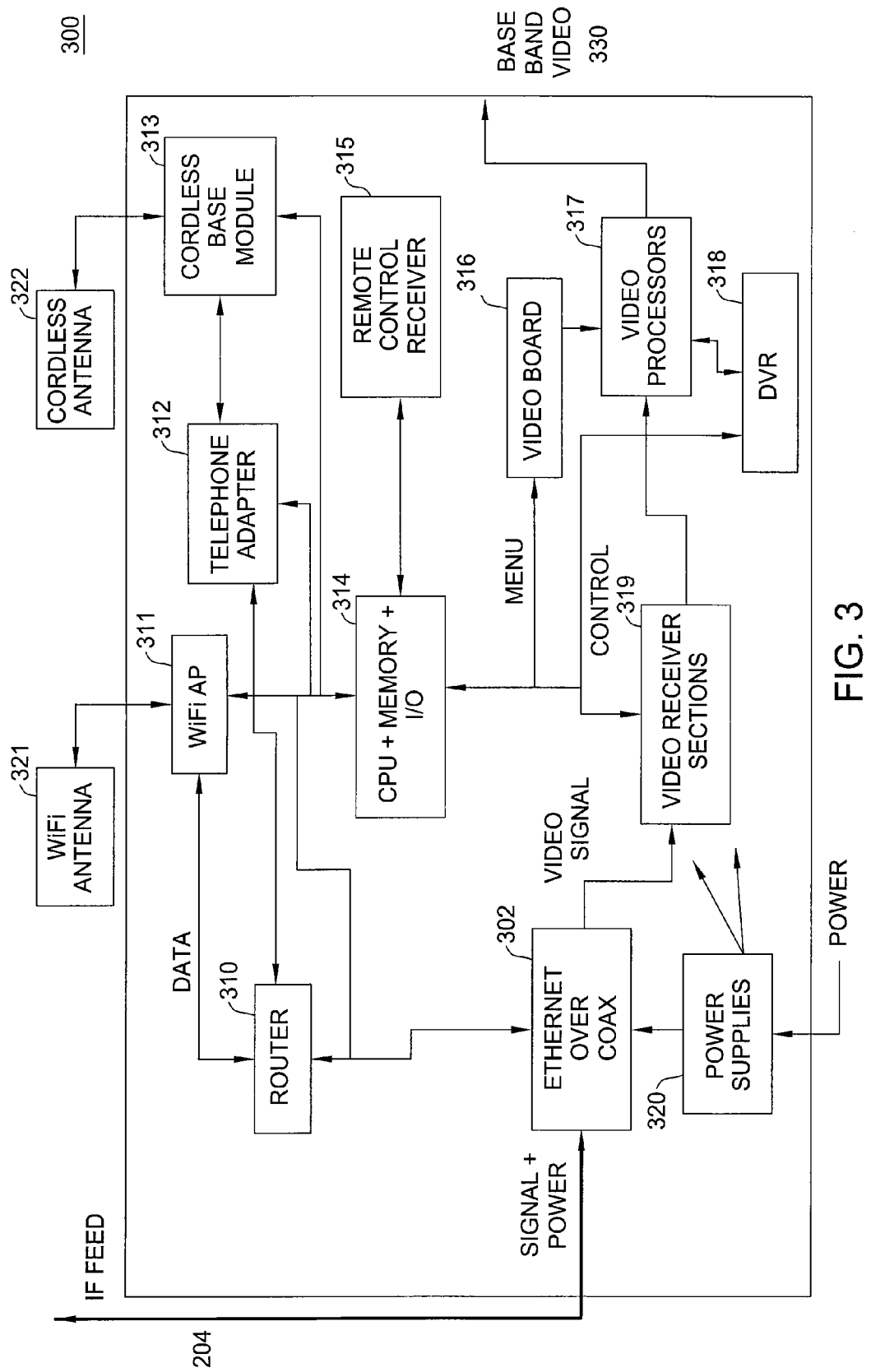
FIG. 3 illustrates a block diagram of an exemplary triple play service set top box of the present invention.

FIG. 3 illustrates a block diagram of an exemplary triple play service set top box 300 of the present invention. FIG. 3 provides the next level of details of set top box 105 shown in FIG. 1. Set top box 300 uses power supplies 320 to receive power externally and distributes power to all modules internally. In one embodiment, set top box 300 uses Ethernet over coax module 302 to communicate with a triple play service ODU 200 shown in FIG. 2 using coaxial cable 204 as shown in both FIG. 2 and FIG. 3. In addition, Ethernet over coax module 302 distributes power received from power supplies 320 to the triple play service ODU via coaxial cable 204.

In one embodiment, set top box 300 comprises router module 310 that supports Internet Protocol (IP) routing and firewall functions to other components such as Wi-Fi Access Point (AP) module 311 and Telephone Adaptor (TA) module 312. Wi-Fi AP module 311 provides wireless data connectivity to Wi-Fi compatible end point devices in the household via Wi-Fi antenna 321. TA module 312 provides VoIP connectivity to cordless base station module 313. In turn, cordless base station module 313 provides in-house wireless voice connectivity to compatible cordless telephones via cordless antenna 322. For instance, wireless voice connectivity can be supported using the DECT specifications.

TV receiver section module (or broadly video receiver section) 319 supports video receiver function of the video signal received from the triple play service ODU via Ethernet over coax module 302. For example, TV receiver module 319 sends the received video signal to video processors module 317 for further processing, including, but not limited to, digital video signal decompression. Video processors module 317 provide connectivity of the processed video signal to Digital Video Recorder (DVR) module 318 for recording and storage purposes. DVR module 318 provides playing, recording and storing of processed video files. Video processors module 317 also distribute baseband video signal using baseband video jack 330 to a household TV.

Computer Processing Unit (CPU), memory, and input/output (I/O) module 314 provides the overall control functions of the components, such as router module 310, Wi-Fi AP module 311, TA module 312, cordless base station module 313, video receiver sections module 319, and DVR module 318, in the set top box 300. CPU, memory, I/O module 314 also sends the user control display screen contents to be displayed on a TV or a video monitor via video board module 316. Video board module 316 in turn sends the user control display screen contents to video processors module 317 to be displayed on a TV or a video monitor. Remote control receiver module 315 provides remote control function to support commands received from an external remote control using the CPU, memory, I/O module 314.

Figure 12:
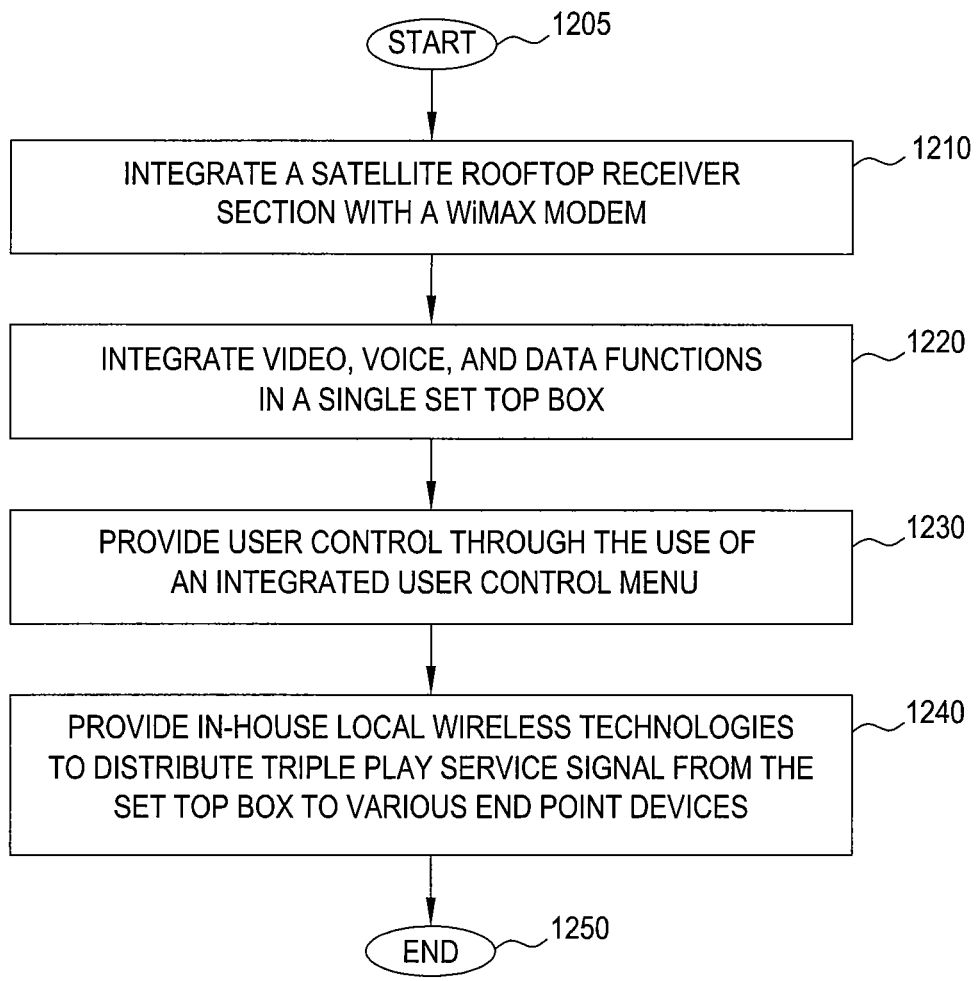
FIG. 12 illustrates a flowchart of a method for enabling integrated triple play services of the present invention.

FIG. 12 illustrates a flowchart of a method 1200 for enabling integrated triple play services of the present invention. Method 1200 starts in step 1205 and proceeds to step 1210.

In step 1210, the method 1200 integrates a satellite rooftop receiver section with a wireless broadband modem, such as a WiMAX modem. The integrated rooftop receiver provides both satellite video service support and wireless broadband voice and data service support using a single ODU structure. The combined video, voice, and data signals are distributed to and from a set top box in a household using a single coaxial cable.

In step 1220, the method integrates video, voice, and data functions into a single set top box. The set top box integrates video services function via video receiver sections module, data services function via a firewall router module and a Wi-Fi AP module, voice services function via a VoIP TA module and a cordless telephone base station module into a single set top box device.

In step 1230, the method provides centralized user control through the use of an integrated user control menu. The details of the centralized user control screen display are shown in user control screen display 700 in FIG. 7. The user control screen provides a single place where the user can control all aspects of the triple play services and their associated functions.

In step 1240, the method provides in-house local wireless technologies to distribute triple play service signals from the set top box to various end point devices. For instance, video signals are distributed using a UWB network, data signals are distributed using a Wi-Fi network, and voice signals are distributed using a cordless telephone network, such as DECT. The method ends in step 1250.

One feature for a triple play service set top box is to provide battery backup for the critical voice communication, sometimes known as a lifeline service, during power failures. Such backup is provided in a systematic manner, all configurable by a user.

Returning to FIG. 3, the backup power management method will be described as applied to the various modules of the set top box 300. First, during initial power failure, every modules of the set top box continues to operate normally. Namely, there is no immediate need to trigger the backup power management method if the power failure is experienced only for a very short duration.

Second, after a timer exceeds a first predefined value of time period (e.g., 10 minutes and the like) or a battery voltage level drops below a first predefined value of voltage, all video related modules in the set top box are then turned off. Using set top box 300 shown in FIG. 3 as an example, this includes modules such as video board module 316, remote control receiver module 315, video receiver sections module 319, video processors module 317, and DVR module 318. In addition, using ODU 200 in FIG. 2 for further illustrations, LNB 201 in the triple play service ODU 200 is also turned off. This is performed by sending a specific message to the broadband wireless modem outside to terminate the power supply voltage to LNB 201.

Third, after the timer exceeds a second predefined value of time period (e.g., another 10 minutes) or the battery voltage level drops below a second predefined value of voltage, again using set top box 300 in FIG. 3 as an example, Wi-Fi AP module 311 in the set top box is then turned off. In addition, the broadband wireless modem of the triple play service ODU, such as a WiMAX modem, enters into a paging mode of operation. Using ODU 200 in FIG. 2 for further illustrations, at this point, the only modules in the triple play service ODU operating are wireless broadband modem 202 operating with minimal power in paging mode and Ethernet over coax module 203 in triple play service ODU 200 located on the rooftop. In addition, within set top box 300, Ethernet over coax module 302, TA module 312, router module 310, cordless base station module 313, as well as CPU, memory, I/O module 314 are the only modules in the set top box that are operating normally. Note that total drainage of the system can be calculated and a battery with proper holdover-time can be engineered and added to the system to perform all these tasks during a power failure.

Figure 8:
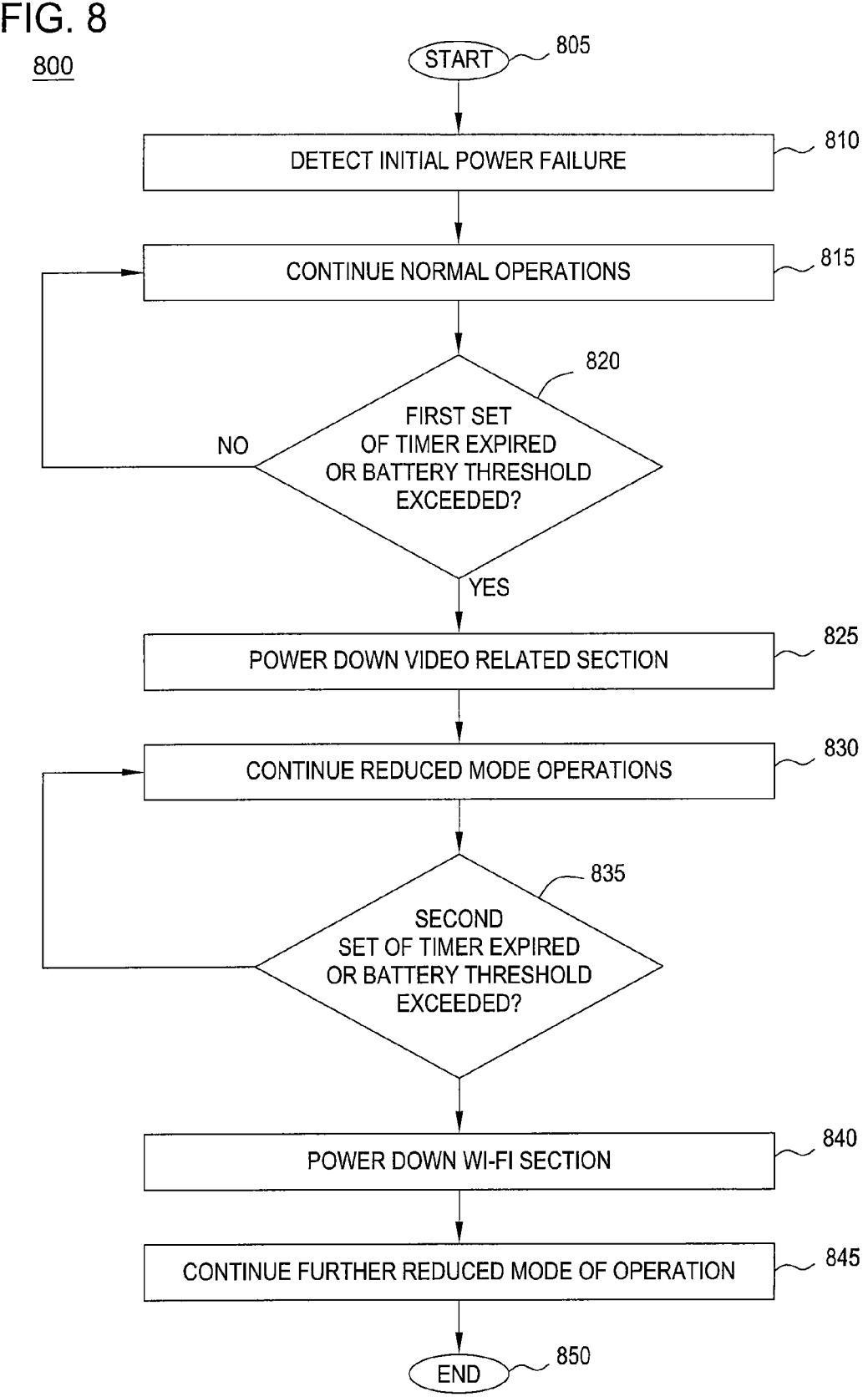
FIG. 8 illustrates a flowchart of a method for power failure handling by the set top box of the present invention.

FIG. 8 illustrates a flowchart of a method 800 for providing power failure handling by the set top box of the present invention. For example, the method is executed by a triple play service set top box. Method 800 starts in step 805 and proceeds to step 810.

In step 810, the method detects the initial power failure. The failure is detected by a triple play service set top box located within a household.

In step 815, the method continues normal operations using backup battery power.

In step 820, the method checks if the first predefined timer value is exceeded or the battery voltage level associated with the backup battery drops below the first predefined voltage level. If the first predefined timer value is exceeded or the battery voltage level associated with the backup battery drops below the first predefined voltage level, the method proceeds to step 825; otherwise, the method proceeds back to step 815.

In step 825, the method 800 activates a first reduced power of operation, e.g., powers off all video related modules, including the video board module, the remote control receiver module, the video receiver sections module, the video processors module, and the DVR module in the set top box. In addition, the LNB in the triple play service ODU is also turned off. This is performed by sending a specific message to the ODU to terminate the power supply voltage to the LNB.

In step 830, the method 800 continues to operate in this current reduced power mode with the aforementioned modules turned off.

In step 835, the method checks if the second predefined timer value is exceeded or the battery voltage level associated with the backup battery drops below the second predefined voltage level. If the second predefined timer value is exceeded or the battery voltage level associated with the backup battery drops below the second predefined voltage level, the method proceeds to step 840; otherwise, the method proceeds back to step 830.

In step 840, the method activates a second reduced power of operation, e.g., turns off the Wi-Fi AP module in the set top box. In addition, the broadband wireless modem of the triple play service outdoor unit, such as a WiMAX modem, enters into a paging mode of operation to conserve power and to support the critical lifeline telephone service. The lifeline telephone service refers to a telephone service that continues to operate normally even if a household power failure has occurred.

In step 845, the method continues to operate in this further reduced power mode until power is restored or until the backup battery is completely drained. At this point, the only components of the triple play service system operating are the wireless broadband modem using minimal power and the Ethernet over coax module in the triple play service outdoor unit located on the rooftop, the Ethernet over coax module, the TA module, the router module, the cordless base station module, as well as the CPU, memory, I/O module in set top box. The method ends in step 850. Of course during this entire process if power is restored, after a predetermined time to ensure stability of the power, the system enters the "normal" operation and power to all sections of the system will be restored.

Figure 4:
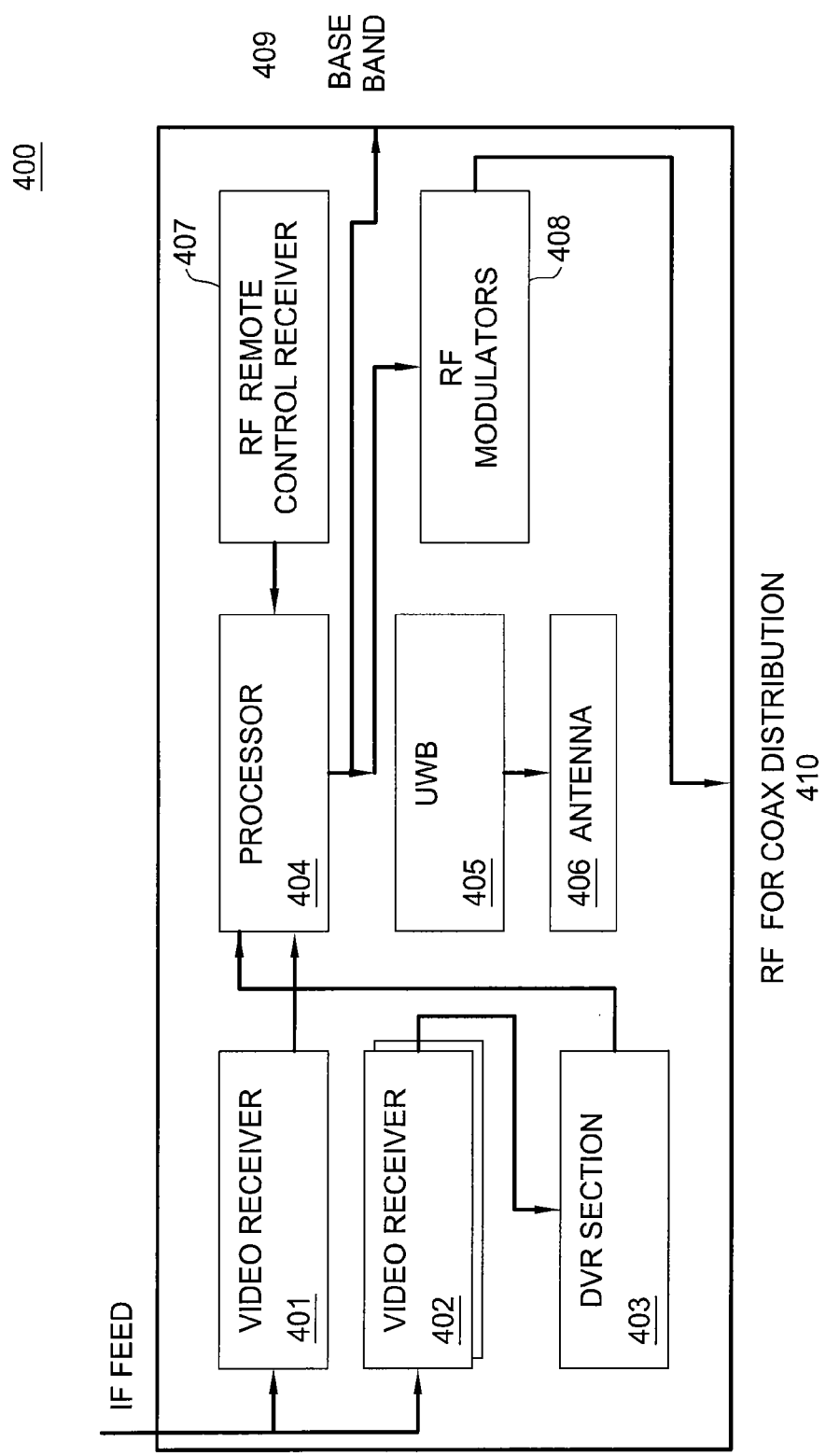
FIG. 4 illustrates a block diagram of an exemplary triple play service video receiver section supporting both wired and wireless in-house video distribution in one embodiment of the present invention.

FIG. 4 illustrates a block diagram of an exemplary triple play service video receiver section 400 for supporting both wired and wireless in-house video distribution in one embodiment of the present invention. Video receiver module 401 and video receiver module 402 represent independent video receivers. In practice, one video receiver is needed for each in-house TV that needs to be supported. Processor module 404 provides the video signaling processing functions including, but not limited to, digital video signal decompression. Processor module 404 can support video signal processing for multiple video receivers. DVR module 403 supports digital video playback, recording, and storage of video programming within the set top box. After one or more video signal streams have been processed by processor module 404, the processed video signals can be distributed within the household via baseband video jack 409, radio frequency (RF) modulators module 408 using coaxial cable distribution jack 410, or UWB module 405 using antenna 406. The baseband video jack 409 and RF modulators module 408 using coaxial cable distribution jack 410 are used to provide wired video distribution in the household. The UWB module 405 using antenna 406 provides wireless video distribution in the household.

In one embodiment, the set top box in a triple-play service system becomes the communication and entertainment center of the house. Thus, one function of the set top box is the distribution of video in the household. The set top box being the source of all audio and video contents in the household has to provide connectivity to all TVs inside the house that are not co-located with the set top box. This can be done via a wireless connection or a wired connection.

Figure 5:
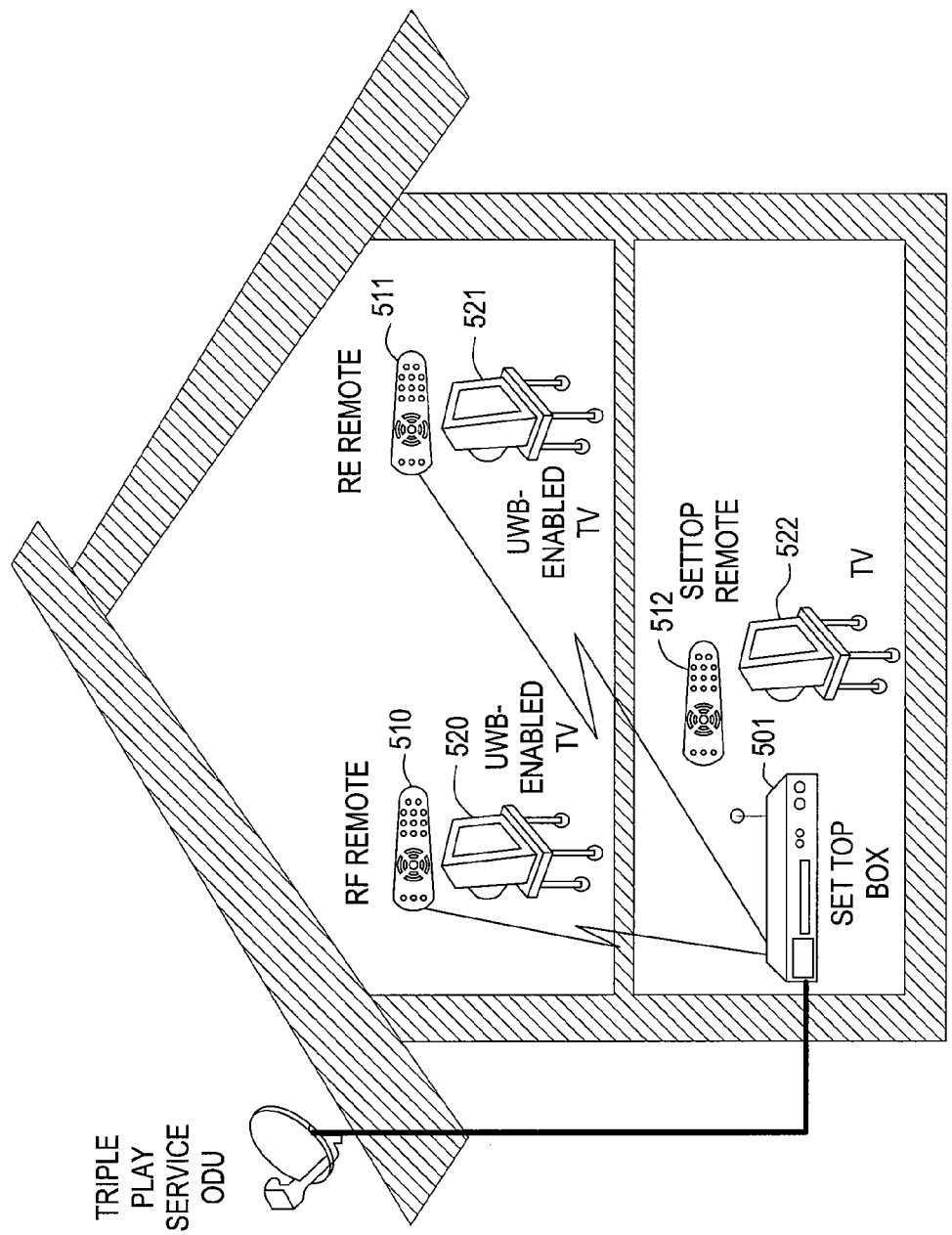
FIG. 5 illustrates an exemplary wireless video distribution in a household of the present invention.

FIG. 5 illustrates an exemplary wireless video distribution method in a household 500 of the present invention. In FIG. 5, set top box 501 distributes video signals to UWB enabled TV 520 and UWB enabled TV 521 via UWB connectivity. A UWB enabled TV is a TV unit with a UWB radio receiver built in or equipped with an external UWB radio receiver. In turn, channel programming as well as control functions can be controlled by a user using RF remote control 510 or RF remote control 511. For instance, RF remote control 510 provides channel programming as well as control functions associated with UWB enabled TV 520 while RF remote control 511 provides channel programming as well as control functions associated with UWB enabled TV 521. In FIG. 5, TV 522 which is collocated with set top box 501 can receive video distribution directly from the baseband video jack from set top box 501 via a video cable.

Figure 6:
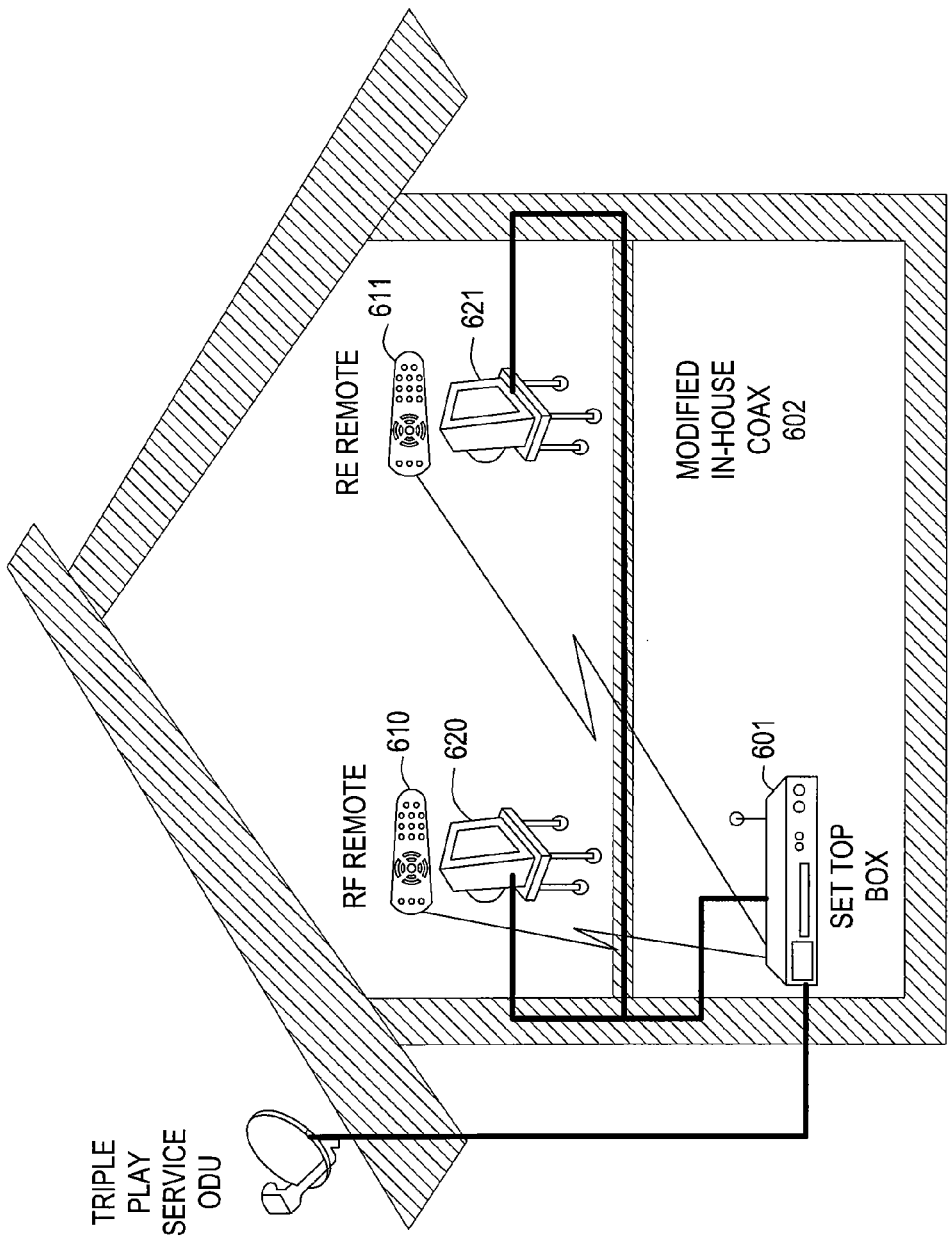
FIG. 6 illustrates an exemplary wired video distribution in a household of the present invention.

FIG. 6 illustrates an exemplary wired video distribution in a household 600 of the present invention. In FIG. 6, set top box 601 distributes video signals to TV 620 and TV 621 using modified in-house coaxial cable 602. Modified in-house coaxial cable 602 can be easily implemented using the existing in-house coaxial cable already in place. The existing coaxial cable distribution for video signals is optimized to distribute from a single location that is not typically collocated with the set top box. In the modified coaxial cable distribution arrangement, the distribution for video signals is optimized to distribute from the set top box instead as shown in FIG. 6. In addition, channel programming as well as control functions can be controlled by a user using RF remote control 610 or RF remote control 611. For instance, RF remote control 610 provides channel programming as well as control functions associated with TV 620 while RF remote control 611 provides channel programming as well as control functions associated with TV 621.

Figure 7:
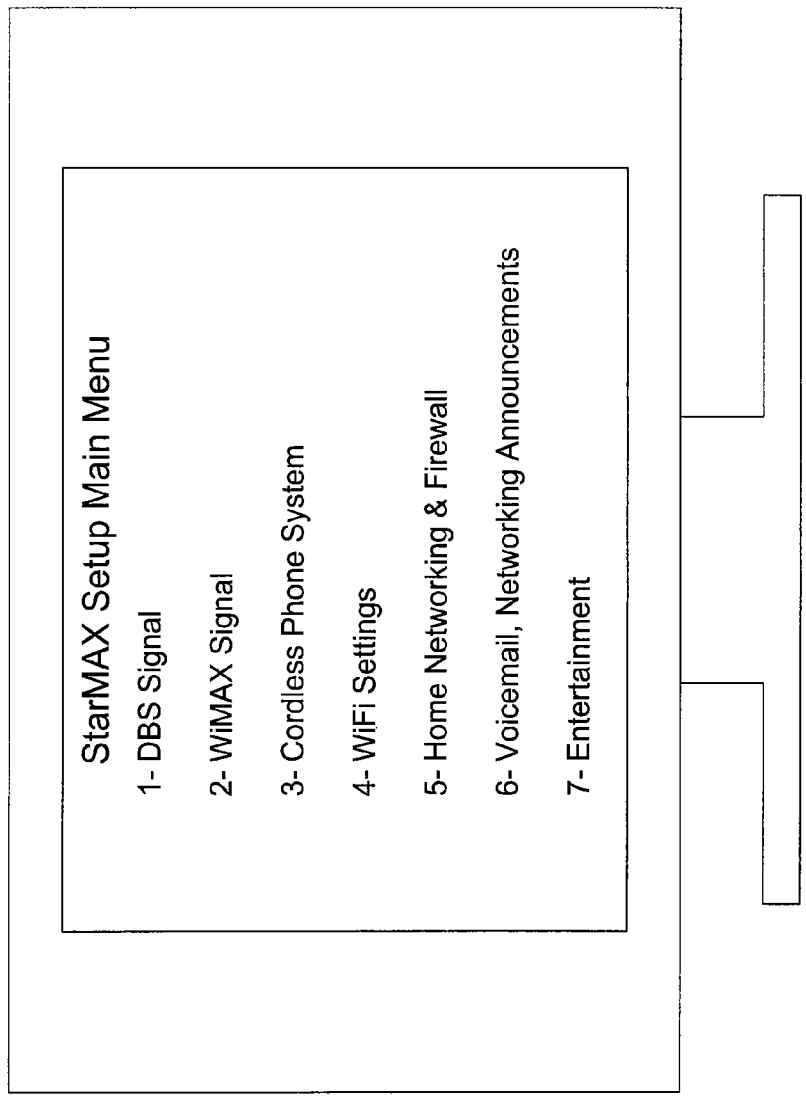
FIG. 7 illustrates an exemplary set top box user control screen display of the present invention.

FIG. 7 illustrates an exemplary set top box user control screen display 700 of the present invention. Display 700 in FIG. 7 is a menu system that comprises the control functions of the triple play service.

Menu item 1 when selected displays a bar graph representing the signal strength level of the Digital Broadcast Signal (DBS) level.

Menu item 2 when selected displays bar graph representing the signal strength level of the WiMAX RF signal.

Menu item 3 when selected provides control functions related to cordless phone system setup including, but not limited to, emergency 911 service setup, voicemail setup, cordless phone handsets setup, directory setup, and caller ID logs setup.

Menu item 4 when selected provides WiFi AP related control functions including, but not limited to, Service Set Identifier (SSID), Wired Equivalent Privacy (WEP) and/or Wi-Fi Protected Access (WPA) encryption setup, and Wi-Fi Channel setup associated with a Wi-Fi network.

Menu item 5 when selected provides IP router related control functions including, but not limited to, IP address setup, firewall setup, Universal Resource Locator (URL) access restriction setup for computer endpoint devices within the household.

Menu item 6 when selected provides access to network messages & voicemail features. Note that in one embodiment, an incoming network message or voicemail message can be indicated by an illuminating LED on the set top box.

Menu item 7 when selected provides home entertainment features such as movie selections.

Note that the display screen can be also used to display Caller ID when receiving incoming phone calls, display Instant Messages, and provide an Internet browser using a remote control. This unified integration of the various functions onto a unified user interface will enhance user experience tremendously.

The idea of having outdoor wireless broadband modem integrated with the satellite receiver overcomes multiple issues of providing the triple-play service previously not possible, e.g., very high radio frequency link margins allowing high-quality service, and convenience of a single device providing all these services inside homes. In addition, legacy wired phone system already existing in homes can be replaced with the more advanced VoIP services combined with advanced cordless technologies within the household and wireless access technologies to interconnect to a VoIP service provider. In one embodiment, the present invention provides tip and ring capability for a household as part of the triple play service using wireless access. The tip and ring capability refers to a pair of wires typically connected via a RJ11 telephone jack that are used to support in-house traditional telephone connectivity.

Figure 9:
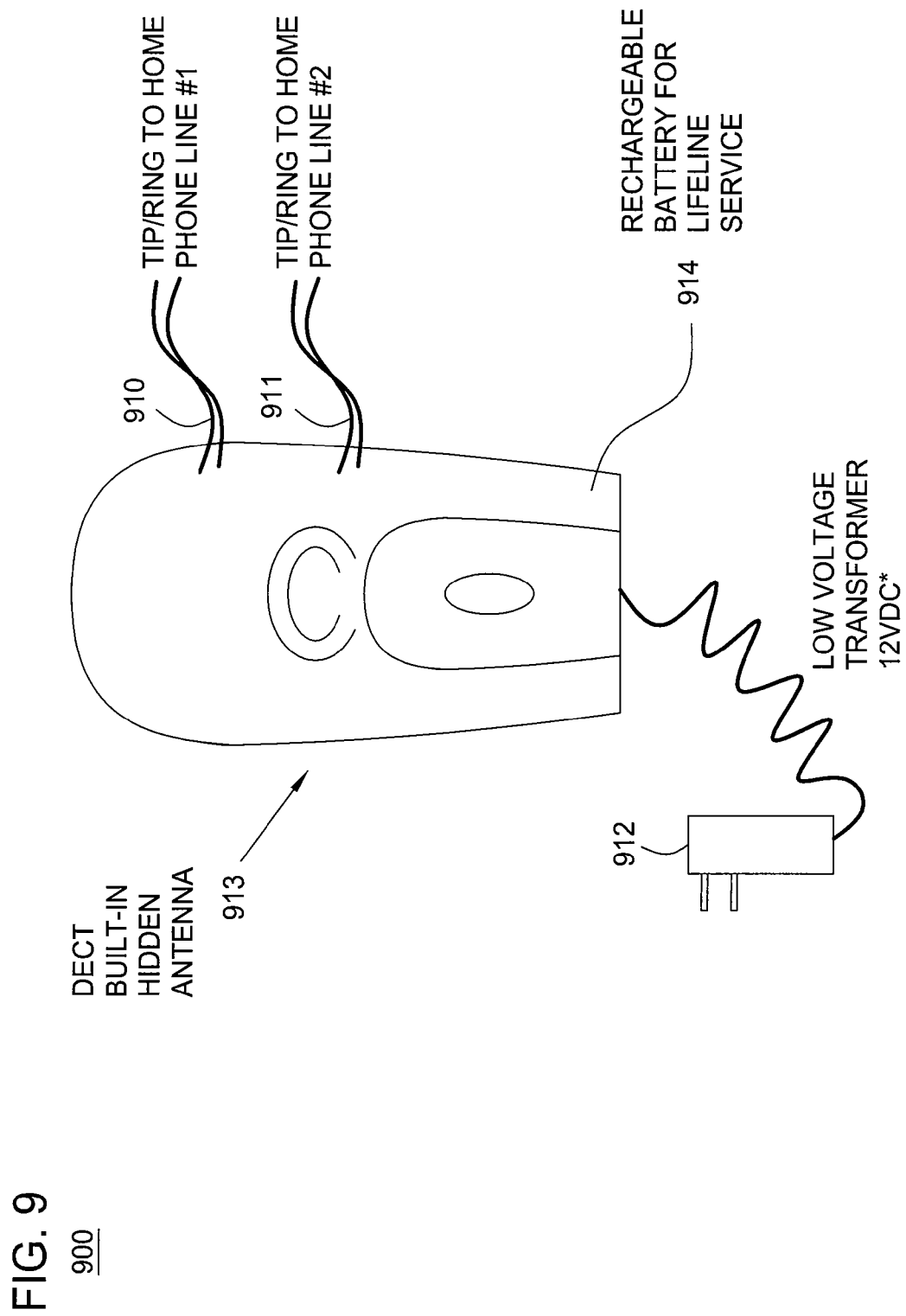
FIG. 9 illustrates an exemplary tip and ring replacement device of the present invention.

FIG. 9 illustrates an exemplary cordless tip and ring replacement device 900 of the present invention. In this embodiment, the present invention obsoletes the current legacy telephone services that provide wired telephone connections to a household via the use of a phone company Network Interface Unit (NIU). Connecting wires from the back of the cordless tip and ring replacement device 900, to the internal wiring of a household provides support of the lifeline telephone service via a wireless broadband access network. The present invention enables the use of device 900 especially designed for this purpose.

For example, the radio transceiver of the cordless handset and its audio electronics are used to provide connectivity to the cordless base station integrated in the triple play service set top box, such as set top box 300. The cordless tip and ring replacement device will be installed inside the household next to the phone company Network Interface Unit (NIU) where in-house telephone wiring is typically originated to replace the installed NIU. Another installation option is to install the cordless tip and ring replacement device anywhere inside the household with an RJ-11 jack. In one embodiment, a cordless tip and ring replacement device with a built in RJ-31 jack provides support for existing security alarm systems.

An NIU is typically installed by a telephone company at a customer location, e.g., a basement, a first floor telecommunication room, a garage, or even outside the building. An NIU is a multi-functional device, which includes a protector block to prevent high-voltage surges from damaging customer premise equipment and inside wirings and allows a telephone service provider to initiate a loop-test back from the central office to test the integrity of the local loop.

In one embodiment, device 900 comprises a first tip and ring phone jack 910, a second tip and ring phone jack 911, a power supply transformer 912, a built in hidden antenna 913 supporting a cordless telephone specification used for in-house purposes, such as the DECT specification, and a built-in backup battery 914 used for lifeline telephone service purposes during power outages. Tip and ring phone jack 910 and tip and ring phone jack 911 are used to support typical in-house wired interconnections to legacy telephones. For instance, legacy telephones can be connected to tip and ring phone jack 910 and tip and ring phone jack 911 via inside household wirings. Power supply transformer 912 provides the necessary AC to DC conversion to power device 900. Built-in hidden antenna 913 provides cordless communications between device 900 and a triple play service set top box, e.g., set top box 300 shown in FIG. 3. Built-in backup battery 914 ensures continuous operations of device 900 in the event of a power outage of the household. Since both set top box 300 and device 900 comprise battery backup power to continue to operate in the event of a power outage, this combination provides support of the lifeline telephone service.

When a legacy telephone is connected to tip and ring phone jack 910 on device 900, a user can place an outgoing phone call using the legacy telephone. When an outgoing call is placed, the outgoing call will be sent by device 900 to a triple play service set top box, e.g., set top box 300 shown in FIG. 3, via cordless telephone communications, such as a DECT network. The call is then processed by the VoIP TA residing in the set top box.

When a legacy telephone is connected to tip and ring phone jack 910 on device 900, a user can receiving an incoming phone call using the legacy telephone. When a incoming call is received by the VoIP TA module in a triple play service set top box, the incoming call will be sent from the triple play service set top box, e.g., set top box 300 shown in FIG. 3, via cordless telephone communications, such as a DECT network, to device 900. The call can then be answered by a user using the legacy telephone handset connected to tip and ring phone jack 910.

Figure 10:
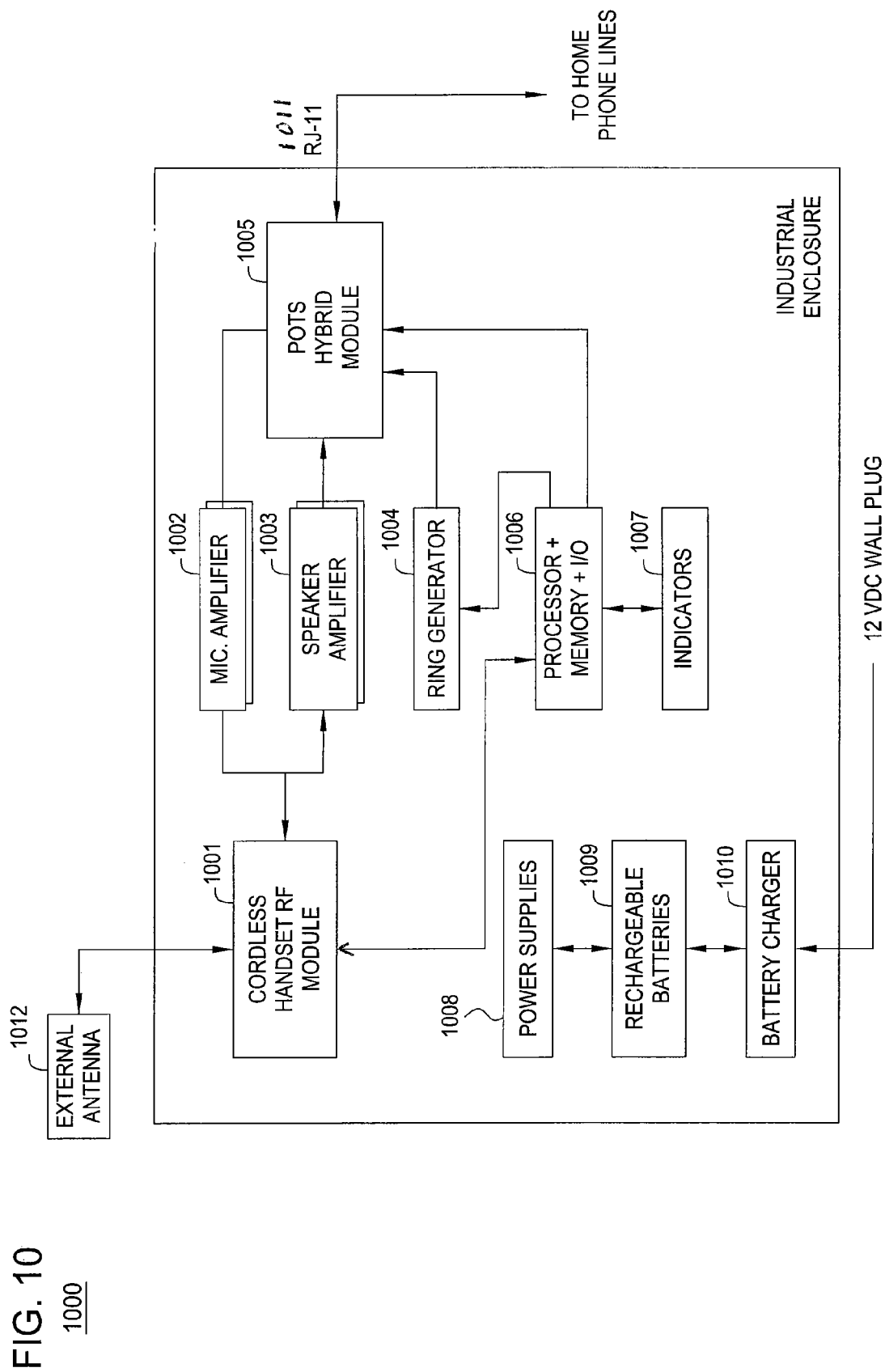
FIG. 10 illustrates a block diagram of an exemplary tip and ring replacement device of the present invention.

FIG. 10 illustrates a block diagram 1000 of an exemplary tip and ring replacement device in one embodiment of the present invention. In one embodiment, the tip and ring replacement device uses Cordless Handset Radio Frequency (RF) Module 1001 to provide cordless communications between module 1001 and a triple play service set top box, such as set top box 300 shown in FIG. 3, using antenna 1012. For instance, the tip and ring replacement device can use DECT cordless specification to provide telephony voice communications between the tip and ring replacement device and the triple play service set top box. Microphone Amplifier module 1002, Speaker Amplifier module 1003, and Ring Generator module 1004 are used to support common telephone handset audio features such as speaker phone and different ring tone selections etc.

In one embodiment, Battery Charger module 1010 connected to external DC power feed provides battery charging capability to Rechargeable Battery module 1009. Battery Charger module 1010 and Rechargeable Battery module 1009 are connected to Power Supplies module 1008 and are in the common power path. This allows Rechargeable Battery module 1009 to power the tip and ring replacement device in the event of a power outage to ensure continuous normal operations of the tip and ring replacement device.

Processor, Memory, I/O module 1006 provides overall general control functions for the tip and ring replacement device. Indicators 1007 are used to provide device status information to an end user. For instance, the tip and ring replacement device can have a voicemail indicator light to indicate the availability of a voicemail, a normal power indicator to indicate device is operating using external power, and a battery power indicator to indicate device is operating using battery power etc.

Plain Old Telephone Service (POTS) Hybrid Module 1005 is an electronic module used to interface a telephone line with regular audio modules, such as Microphone Amplifier module 1002, Speaker Amplifier module 1003, and Ring Generator module 1004. RJ11 Jacks 1011 are used to connect to a legacy telephone to the tip and ring replacement device via internal household telephone wirings. For instance, the tip and ring replacement device can support multiple internal household telephone lines, or tip and ring pairs.

Figure 11:
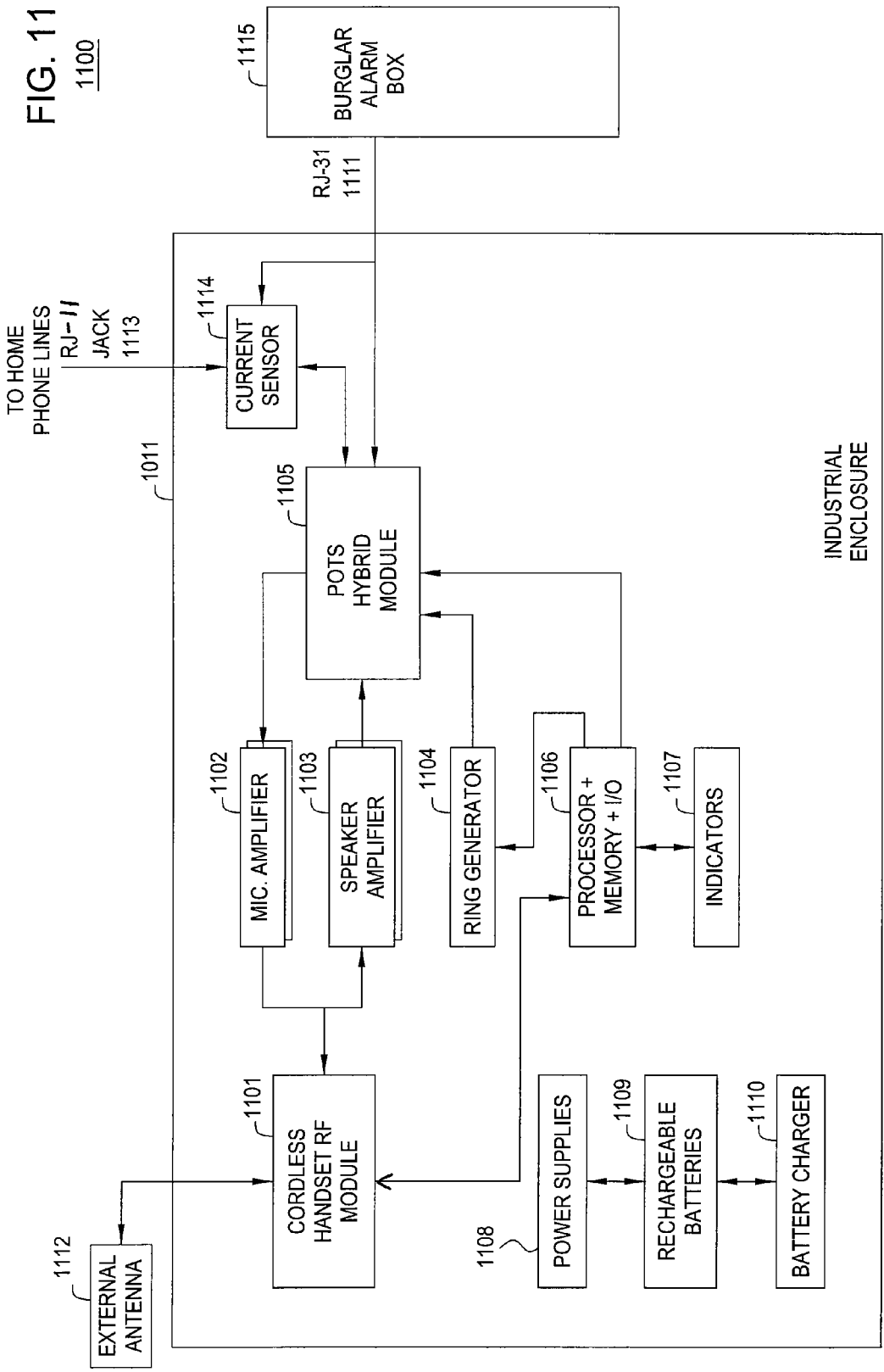
FIG. 11 illustrates a block diagram of an exemplary tip and ring replacement device with RJ31 support of the present invention.

FIG. 11 illustrates a block diagram 1100 of an exemplary tip and ring replacement device with RJ31 support in another embodiment of the present invention. The tip and ring replacement device with RJ31 support 1110 has the same functionality as tip and ring replacement device 1000 shown in FIG. 10 except that it provides additional support for an RJ31 jack that can be used to interconnect a security alarm system, such as Burglar Alarm Box 1115. As such, descriptions of various common modules are provided above with reference to FIG. 10.

In one embodiment, Current Sensor 1114 is used to monitor and detect if RJ11 Jacks 1113 is in use by a user. RJ31 Jack 1111 provides connectivity between Current Sensor 1114, POTS Hybrid Module 1105, and Burglar Alarm Box 1115. When Burglar Alarm Box 1115 needs to communicate with a security service provider, e.g., when a security breach has been detected by the security alarm system, Burglar Alarm Box 1115 can seize the phone line to use POTS Hybrid Module 1105, by disconnecting phone lines connected to RJ11 Jack 1113 from the tip and ring replacement device with RJ31 support using the RJ31 jack arrangement. When this happens, Current Sensor 1114 should detect no current from RJ11 Jack 1113 while the POTS Hybrid Module is in use by Burglar Alarm Box 1115.

Figure 13:
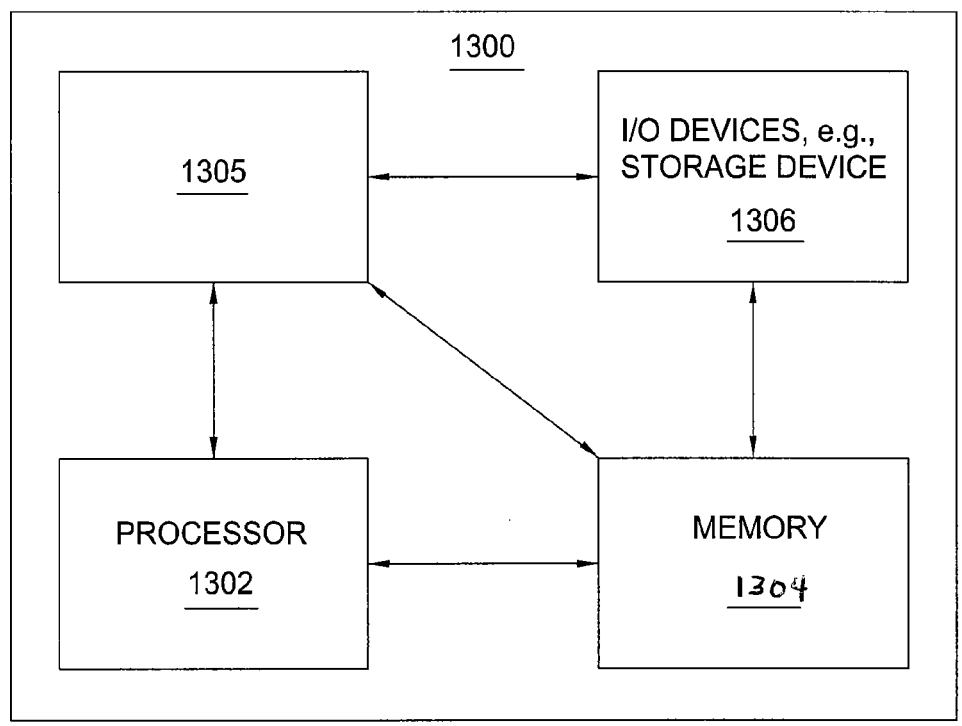
FIG. 13 illustrates a high level block diagram of a general purpose computer suitable for use in performing the functions described herein.

FIG. 13 depicts a high level block diagram of a general purpose computer suitable for use in performing the functions described herein. As depicted in FIG. 13, the system 1300 comprises a processor element 1302 (e.g., a CPU), a memory 1304, e.g., random access memory (RAM) and/or read only memory (ROM), a module 1305 for providing integrated wireless triple play services, and various input/output devices 1306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 1305 for providing integrated wireless triple play services can be loaded into memory 1304 and executed by processor 1302 to implement the functions as discussed above. As such, the present process 1305 for providing integrated wireless triple play services (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing integrated wireless triple play services in a communication network, comprising:
   integrating rooftop components for providing the triple play services, wherein the integrating rooftop components comprises embedding a wireless broadband modem within a satellite receiver rooftop section for generating combined video, voice, and data signals that are carried by a single coaxial cable, wherein the wireless broadband modem transmits and receives broadband voice and data signals to and from a broadband wireless base station;
   integrating in-house components for providing the triple play services;
   providing a unified user control of the triple play services;
   detecting, by the in-house components, a power failure;
   activating, by the in-house components, a first reduced power of operation when a first threshold pertaining to the power failure is exceeded, wherein the activating the first reduced power of operation comprises turning off video related modules; and activating, by the in-house components, a second reduced power of operation when a second threshold pertaining to the power failure is exceeded, wherein the activating the second reduced power of operation comprises maintaining only modules that support lifeline telephony, wherein the first reduced power of operation and the second reduced power of operation are configurable by a user via the unified user control.

2. The method of claim 1, wherein the communication network comprises a satellite network and an internet protocol network.

3. The method of claim 1, wherein the single coaxial cable also carries power from the in-house components to the rooftop components to power the rooftop components.

4. The method of claim 1, wherein the wireless broadband modem is a worldwide interoperability for microwave access based modem.

5. The method of claim 1, wherein the integrating in-house components comprises:
   integrating a video receiver sections module, a router module, a Wi-Fi module, a telephone adaptor module and a cordless telephone base station module into a single triple play set top box.

6. The method of claim 1, wherein the providing the unified user control of the triple play services comprises:
   providing a centralized user control display screen to support an integrated user control menu that is used to control a function of the triple play services.

7. The method of claim 6, wherein the integrated user control menu comprises:
   a menu selection to display a bar graph representing a signal strength level of a digital broadcast signal level;
   a menu selection to display a bar graph representing a signal strength level of a worldwide interoperability for microwave access radio frequency signal;
   a menu selection to provide a control function related to a cordless phone system setup;
   a menu selection to provide a Wi-Fi access point related control function associated with a Wi-Fi network;
   a menu selection to provide an internet protocol router related control function;
   a menu selection to provide access to a messaging function; and
   a menu selection to provide a home entertainment related function.

8. The method of claim 1, further comprising:
   distributing components of the combined video, voice, and data signals in a household using wireless communication.

9. The method of claim 8, wherein video signal components of the combined video, voice, and data signals are distributed using an ultra wideband network, wherein voice signal components of the combined video, voice, and data signals are distributed using a cordless telephone network, and wherein data signals of the combined video, voice, and data signals are distributed using a Wi-Fi network.

10. The method of claim 1, further comprising:
    distributing components of the combined video, voice, and data signals in a household using existing in-house coaxial cable wirings.

11. The method of claim 1, wherein the communication network comprises a satellite network and a worldwide interoperability for microwave access network.

12. The method of claim 1, wherein the communication network comprises a satellite network and a Wi-Fi network.

13. A system for providing integrated wireless triple play services in a communication network, comprising:
    an outdoor unit comprising a plurality of rooftop components for providing the triple play services, wherein the plurality of rooftop components comprises a wireless broadband modem that is embedded within a satellite receiver rooftop section for generating combined video, voice, and data signals that are carried by a single coaxial cable, wherein the wireless broadband modem transmits and receives broadband voice and data signals to and from a broadband wireless base station; and
    a display for providing a unified user control of the triple play services; and a triple play service set top box comprising a plurality of in-house components for providing the triple play services, wherein the triple play service set top box performs the operations comprising: detecting a power failure; activating a first reduced power of operation when a first threshold pertaining to the power failure is exceeded, wherein the activating the first reduced power of operation comprises turning off video related modules; and activating, by the in-house components, a second reduced power of operation when a second threshold pertaining to the power failure is exceeded, wherein the activating the second reduced power of operation comprises maintaining only modules that support lifeline telephony, wherein the first reduced power of operation and the second reduced power of operation are configurable by a user via the unified user control.

14. The system of claim 13, wherein the communication network comprises a satellite network and an internet protocol network.

15. The system of claim 13, wherein the single coaxial cable also carries power from the in-house components to the plurality of rooftop components.

16. The system of claim 13, wherein the wireless broadband modem is a worldwide interoperability for microwave access based modem.

17. The system of claim 13, wherein the plurality of in-house components comprises a video receiver sections module, and a router module.

18. The system of claim 13, wherein the triple play service set top box distributes components of the combined video, voice, and data signals in a household using wireless communication.

* * * * *